US007086033B2

(12) United States Patent
Bates et al.

(10) Patent No.: US 7,086,033 B2
(45) Date of Patent: Aug. 1, 2006

(54) SOFTWARE DEBUGGER HAVING A MONITOR FOR MONITORING CONDITIONAL STATEMENTS WITHIN A SOFTWARE PROGRAM

(75) Inventors: Cary Lee Bates, Rochester, MN (US); Paul Reuben Day, Rochester, MN (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/132,334

(22) Filed: Apr. 25, 2002

(65) Prior Publication Data

US 2003/0204837 A1 Oct. 30, 2003

(51) Int. Cl.
*G06F 9/44* (2006.01)
*G06F 11/00* (2006.01)

(52) U.S. Cl. ............ 717/124; 717/125; 717/126; 717/127; 717/129; 714/38

(58) Field of Classification Search ........ 717/124–126, 717/128–131; 714/38; 707/4
See application file for complete search history.

(56) References Cited

U.S. PATENT DOCUMENTS

| 4,860,204 | A | * | 8/1989 | Gendron et al. ............ 717/109 |
| 5,187,789 | A | * | 2/1993 | O'Hair .......................... 707/4 |
| 5,946,488 | A | * | 8/1999 | Tanguay et al. ............ 717/141 |
| 6,077,312 | A | * | 6/2000 | Bates et al. ................. 717/129 |
| 6,079,032 | A | * | 6/2000 | Peri ............................. 714/38 |
| 6,141,791 | A | * | 10/2000 | Takuma et al. ............. 717/125 |
| 6,263,489 | B1 | * | 7/2001 | Olsen et al. ................. 717/129 |
| 6,275,976 | B1 | * | 8/2001 | Scandura ...................... 717/120 |
| 6,412,106 | B1 | * | 6/2002 | Leask et al. ................ 717/124 |
| 6,434,741 | B1 | * | 8/2002 | Mirani et al. ............... 717/124 |
| 6,438,713 | B1 | * | 8/2002 | Taira et al. ................... 714/38 |
| 6,681,384 | B1 | * | 1/2004 | Bates et al. ................. 717/129 |
| 6,745,384 | B1 | * | 6/2004 | Biggerstaff ................. 717/156 |
| 6,760,903 | B1 | * | 7/2004 | Morshed et al. ............ 717/130 |
| 6,795,962 | B1 | * | 9/2004 | Hanson ...................... 717/129 |

OTHER PUBLICATIONS

TITLE: Integrated Debugging and Performance Monitoring for Parallel Programs, author: Krumme et al, IEEE, 1991.*
TITLE: A New Framework for Debugging Globally Optimized code, auhor: Wu et al, ACM, 1999.*
TITLE: Debugging Standard ML without Reverse Engineering, author: Tolmach et al, ACM, 1990.*

* cited by examiner

*Primary Examiner*—Chameli C. Das
(74) *Attorney, Agent, or Firm*—Dillon & Yudell, LLP

(57) ABSTRACT

A software debugger having a monitor for monitoring conditional statements within a software program is disclosed. A program construct is initially identified within a software program. After identifying a point of interest within the program construct, a group of debug instructions is associated with the point of interest within the program construct. In response to a debug stop occurred at the point of interest, the information related to the associated program construct according to the group of debug instructions as a result of executing the instructions within the program construct is displayed.

14 Claims, 5 Drawing Sheets

SOFTWARE DEBUGGER HAVING A MONITOR FOR MONITORING CONDITIONAL STATEMENTS WITHIN A SOFTWARE PROGRAM

BACKGROUND OF THE INVENTION

1. Technical Field

The present invention relates to software development in general, and in particular to software debuggers. Still more particularly, the present invention relates to a software debugger having a monitor for monitoring conditional statements within a software program.

2. Description of the Related Art

The process of eliminating errors during software development is commonly known as debugging. Debugging can be costly and time consuming, depending on the complexity of the software being developed. Accordingly, software tools, such as debuggers, have been developed for reducing debugging cycle time. Debuggers typically execute as self-contained processes for controlling an application program under study through operating system primitives designed for that purpose.

An application program usually includes data and functions that operate on those data. The data and functions are defined in a source file. A tool called a compiler reads the source file and produces an object file. The compiler typically works in conjunction with other tools, such as an assembler, a linker and an optimizer, to accomplish such task. The object file contains bits that can be loaded into a computer memory to be executed. After having been loaded into the computer memory, the bits are called a program image. The object file also contains a symbol table that maps some of the original source information, such as variable and function names, onto addresses, offsets, sizes, and other pertinent properties of the program image. Quite often, the symbol table is not made part of the program image itself, but remains in the object file where other programs, such as the debugger, can read and analyze it.

A debugger can be used to examine the program image of a program in its execution state. Because the debugger has access to the symbol table, it allows a programmer to interact with the target process in terms of the names found in the source file. By going to the symbol table and looking up the variable's address and type, the debugger obtains the information it needs to satisfy the request from the programmer.

A debugger is often used to intercept or monitor the execution of a software program. It is usually the case that either the debugger or the target program is in control, but not both. If the target program is running, the programmer can interact directly with the target program while the debugger lies dormant. If the debugger is running, the programmer has the attention of the debugger and the target program is usually stopped (i.e., its program counter advances no further). When the debugger is running, it is said to be in control; when the debugger causes the target program to begin (or resume) execution, the debugger relinquishes control. The debugger will regain control after the target program counter reaches a pre-determined address. The debugger can deposit a machine instruction at that address, designed to cause some trap or to cause an operating system service to be called when it is executed. By virtue of prior arrangements between the debugger and the operating system, two things happen when the target program reaches one of those instructions: 1) the execution of the target program is put aside or stopped, and 2) the debugger is notified of the event and re-gains control. The debugger is able to determine the location of the event by examining program image state information saved by the operating system. Such special instructions, or the loci of such instructions, are called breakpoints. Breakpoints are usually set at the direction of the programmer, who may want to know if and when execution reaches a certain point in an application program, and may further desire to examine certain state information after the breakpoint has been triggered.

When debugging an application program that includes complex conditional statements, such as many levels of nested IF statements, it is often very time-consuming to determine why a conditional branch is taken. Today, there are basically two approaches a debugger can take in dealing with IF statements. The first approach is to allow a user to only step once on the IF statement such that one step will take the user either past the IF statement or to an associated ELSE statement. With such an approach, when the conditional branch statement is taken off to a path different from what the user expected, the user must start the process of evaluating variables and examining boolean logic to determine what had happened. The second approach is to allow a user to step through every single statement associated with an IF statement. While the second approach does facilitate a user in understanding exactly why the IF statement branches one way or the other, it is tedious and time-consuming for the user to always have to step through each condition whenever an IF statement is encountered. In addition, the user would not benefit from such feature unless the user knew ahead of time that a particular IF statement is going to be triggered (or very likely to be triggered) in a manner different from what the user expected.

Consequently, it is desirable to provide an improved software debugger for monitoring conditional statements within a software program.

SUMMARY OF THE INVENTION

In accordance with a preferred embodiment of the present invention, a program construct is initially identified within a software program. After identifying a point of interest within the program construct, a group of debug instructions is associated with the point of interest within the program construct. In response to a debug stop occurred at the point of interest, the information related to the associated program construct according to the group of debug instructions as a result of executing the instructions within the program construct is displayed.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
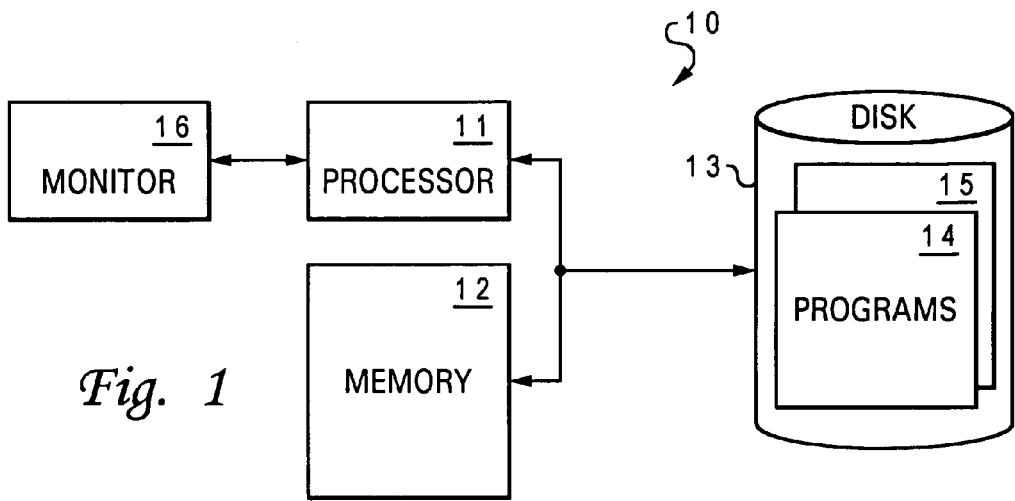
FIG. 1 is a block diagram of a data processing system in which a preferred embodiment of the present invention is applicable.

Referring now to the drawings and in particular to FIG. 1, there is depicted a block diagram of a data processing system in which a preferred embodiment of the present invention is applicable. As shown, a data processing system 10 includes a processor 11, a memory 12, a hard disk 13, and a monitor 16. Programs 14 are preferably stored within hard disk 13 until programs 14 are needed for execution, at which time programs 14 are brought into memory 12 so that programs 14 can be directly accessed by processor 11. Processor 11 selects a part of memory 12 to read and/or write by using an address processor 11 gives to memory 12 along with a request to read and/or write. Usually, the reading and interpretation of an encoded instruction at an address causes processor 11 to fetch a subsequent instruction, either at a subsequent address or some other address. Hard disk 13 stores the bits that represent executable program steps (i.e., program image) as well as a symbol table 15 for each program that ties its bits back to the information that are in the source code. Symbol table 15 is used, usually by programs such as linkers or debuggers, to interpret variable or function names as addresses in the executable program. The columns of symbol table 15 preferably include:

1. Name: For a variable, it is the name of the variable, either per se or with some simple encoding done by the compiler. For a function, it is a name in which the function signature has been encoded by the compiler. For a type, particularly for a structure definition, it is the corresponding type or structure name.
2. Type: This indicates the primitive type, or derived type, as appropriate, for the entity named in the NAME column.
3. Class: This is a basic designation of what the entry represents: a function, a structure, a structure member, a local variable, etc.
4. Address: The address, or offset, as appropriate, of the symbol is defined in this entry. For types, which in and of themselves take no storage, the size is given in this field.
5. Link: A pointer to an associated "parent" entry in the symbol table. For example, all structure members "point" to their structure declaration entry.

To learn about the behavior of an application program, it is often instructive to monitor its progress during execution. Such can be done by arranging for the application program to stop at certain prearranged points in its sequence of steps, at which time data contents in various addresses within memory 12 can be examined. Those prearranged points are typically known as breakpoints. A succession of arrivals at different breakpoints gives a programmer a feel for the flow of the application program as well as the data contents and intermediate results at those breakpoints.

Figure 2:
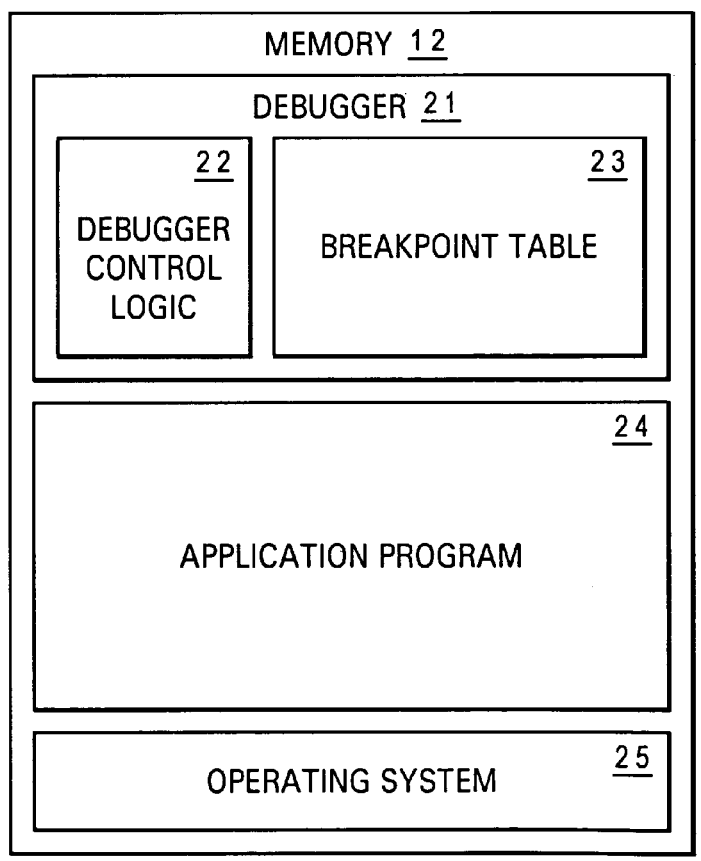
FIG. 2 is a block diagram of the contents within a memory of the data processing system from FIG. 1, in accordance with a preferred embodiment of the present invention.

With reference now to FIG. 2, there is illustrated a block diagram of the contents within memory 12 from FIG. 1, in accordance with a preferred embodiment of the present invention. As shown, memory 12 includes a debugger 21, an application program 24, and an operating system 25. Application program 24 is controlled and observed by debugger 21. Debugger 21 contains a debugger control logic 22 and a breakpoint table 23. Debugger control logic 22 includes sequences of instructions for controlling the behavior of debugger 21. Breakpoint table 23 includes an entry for each of the breakpoints that have been inserted in application program 24. Breakpoint table 23 also contains information that allows each breakpoint to be interpreted in a number of ways, depending on the context of application program 24 when the breakpoint is reached.

The present invention provides an informational monitor window for conditional statements such as IF statements. The informational monitor window is a window within a software debugger that is capable of displaying additional information about a conditional statement that has just been executed. For example, consider the following IF statement:

$$\text{If } (x < 10 \,||\, y == 879 \,\&\&\, j == \text{true})$$
$$k = 1;$$
$$\text{else}$$
$$k = 9898;$$

If the statement k=1 is reached because x<10, then the informational monitor window would display:

x<10 is true which means that x<10 was all that was executed. Otherwise, if the statement k=9898 is reached, then the informational monitor window would display:

x<10 is false y==879 is false which implies that the above-mentioned two expressions were executed. In conjunction, information regarding the expression "j==true" was not tested can also be displayed in the informational monitor window.

Figure 3:
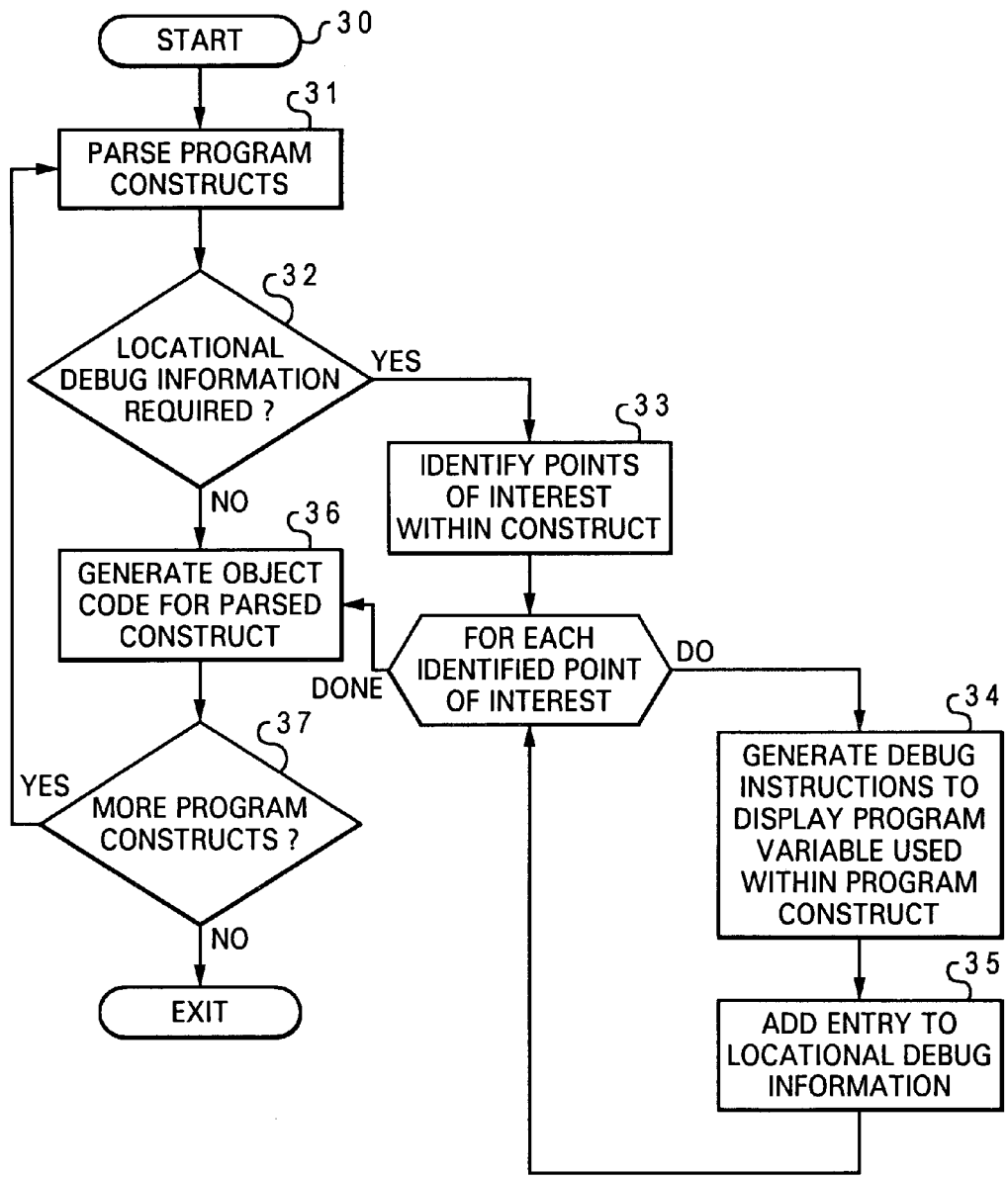
FIG. 3 is a high-level logic flow diagram of a method for generating debug information, in accordance with a preferred embodiment of the present invention.

In order for a software debugger to be able to display information regarding a conditional statement within a software program that has just been executed, certain debug information concerning the software program must first be generated by a compiler during compilation. Referring now to FIG. 3, there is depicted a high-level logic flow diagram of a method for generating debug information such that conditional statements can be monitored by a software debugger, in accordance with a preferred embodiment of the present invention. Starting at block 30, program constructs of a software program are parsed by a compiler, as shown in block 31. For each program construct, a determination is then made as to whether or not locational debug information is needed, as depicted in block 32. In this example, locational debug information is defined as any debug information associated with a conditional statement such as an IF statement. However, locational debug information can be supplied for any type of statements defined by a compiler developer. If locational debug information is needed for the program construct, certain points of interest within the program construct are identified, as shown in block 33. In this example, a point of interest within a program construct is defined as a first statement after a conditional statement within a program construct. Then, for each program construct, debug instructions to debug variables used within the program construct are generated, as depicted in block 34; and an entry is added to a locational debug information table (see FIG. 4), as shown in block 35.

Otherwise, if locational debug information is not needed for the program construct, object code for the parsed program construct is generated, as depicted in block 36. The process repeats until all the program constructs have been processed, as shown in block 37.

Figure 4:
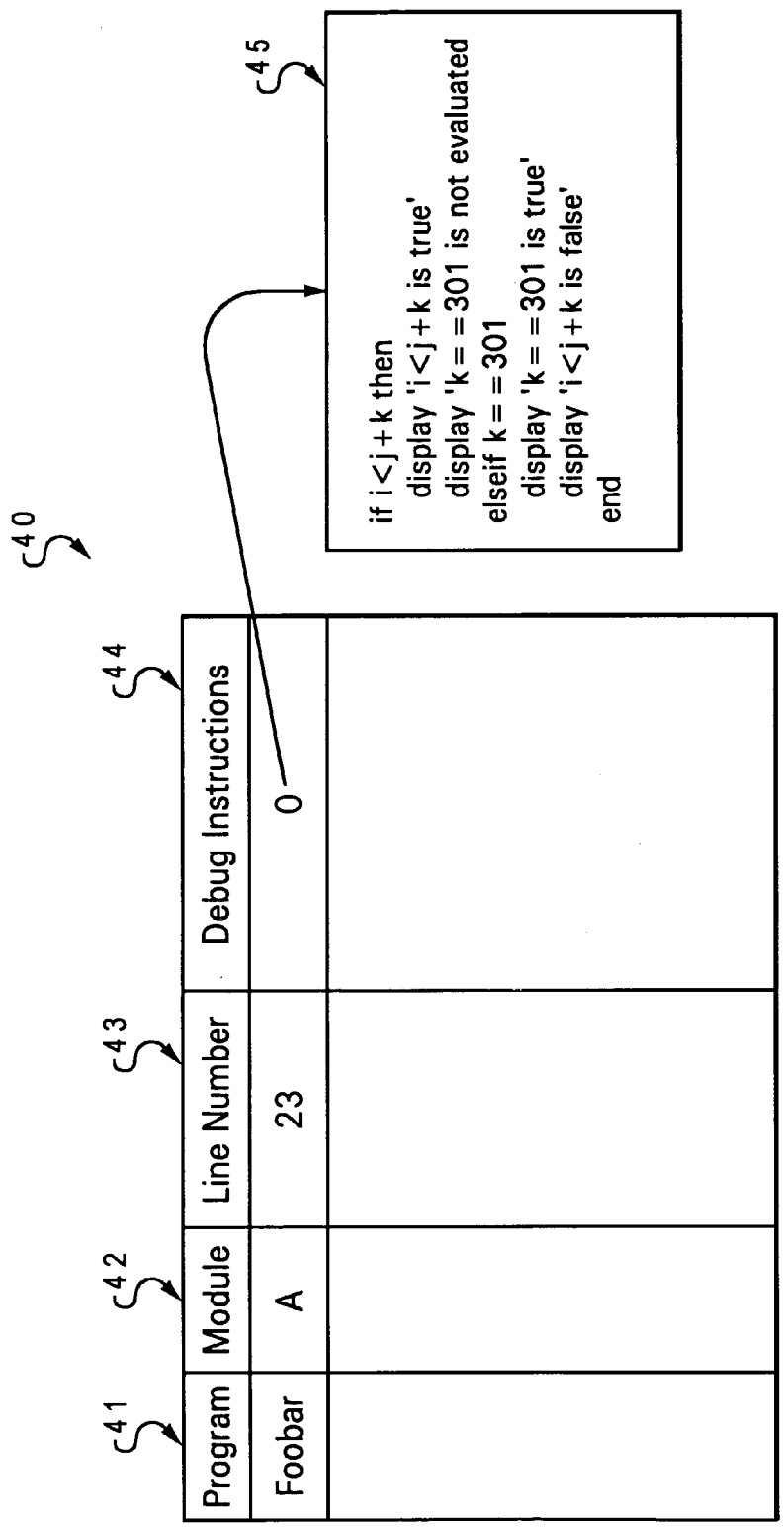
FIG. 4 is a diagram of a table for storing locational debug information, in accordance with a preferred embodiment of the present invention.

With reference now to FIG. 4, there is depicted a diagram of a locational debug information table for storing locational debug information, in accordance with a preferred embodiment of the present invention. As shown, a locational debug information table 40 includes a program name column 41, a module name column 42, a line number column 43, a debug instructions column 44. Program name column 41 stores the name of a software program on which a software debugger is working. Module name column 42 stores a name of a module within the software program listed in program name column 41. Line number 43 stores a line number of a point of interest within a module in module column 42. Debug instructions column 44 contains debug expressions (or instructions) for the conditional logic such that only values and expressions participated in causing the conditional statement to branch one way or the other can be displayed in the information monitor window.

For example, if module A of a software program Foobar contains the following lines of code:

```
.
.
.
18        int foo(int i, j, k)
19        {
20            int t = 45;
21            if (i < j + k || k == 301)
22            {
23                t = k+1;
24            }
25            return t;
26        )
.
.
.
```

Then, debug instructions column 44 of locational debug information table 40 will contain debug expressions as shown in block 45 of FIG. 4.

Figure 5:
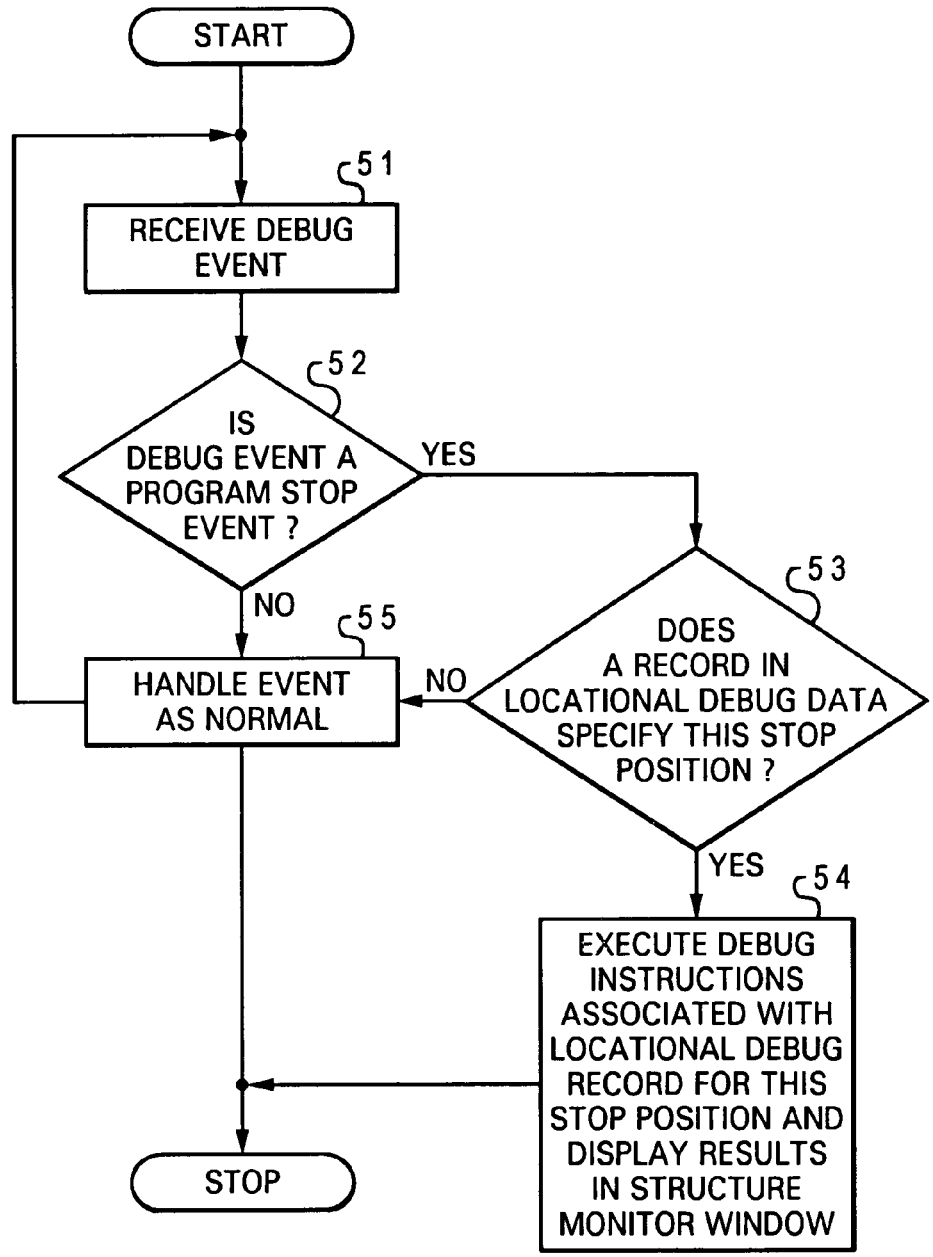
FIG. 5 is a high-level logic flow diagram of a method for handling debug events within a debugger, in accordance with a preferred embodiment of the present invention.

Referring now to FIG. 5, there is depicted a high-level logic flow diagram of a method for handling debug events within a software debugger, in accordance with a preferred embodiment of the present invention. After receiving a debug event, as shown in block 51, a determination is made as to whether or not the debug event is a program stop event (a program stop event is defined as either a step complete or a breakpoint for a software debugger), as depicted in block 52. If the debug event is a program stop event, then a determination is made as to whether or not the stop position of the program stop event is specified in a locational debug information table (from FIG. 4), as shown in block 53. If so, the debug instructions associated with the stop position according to an associated entry within the locational debug information table are executed, and the result is displayed in an information monitor window within the software debugger, as depicted in block 54. Otherwise, the program stop event is handled as normal, as shown in block 55.

Figure 6:
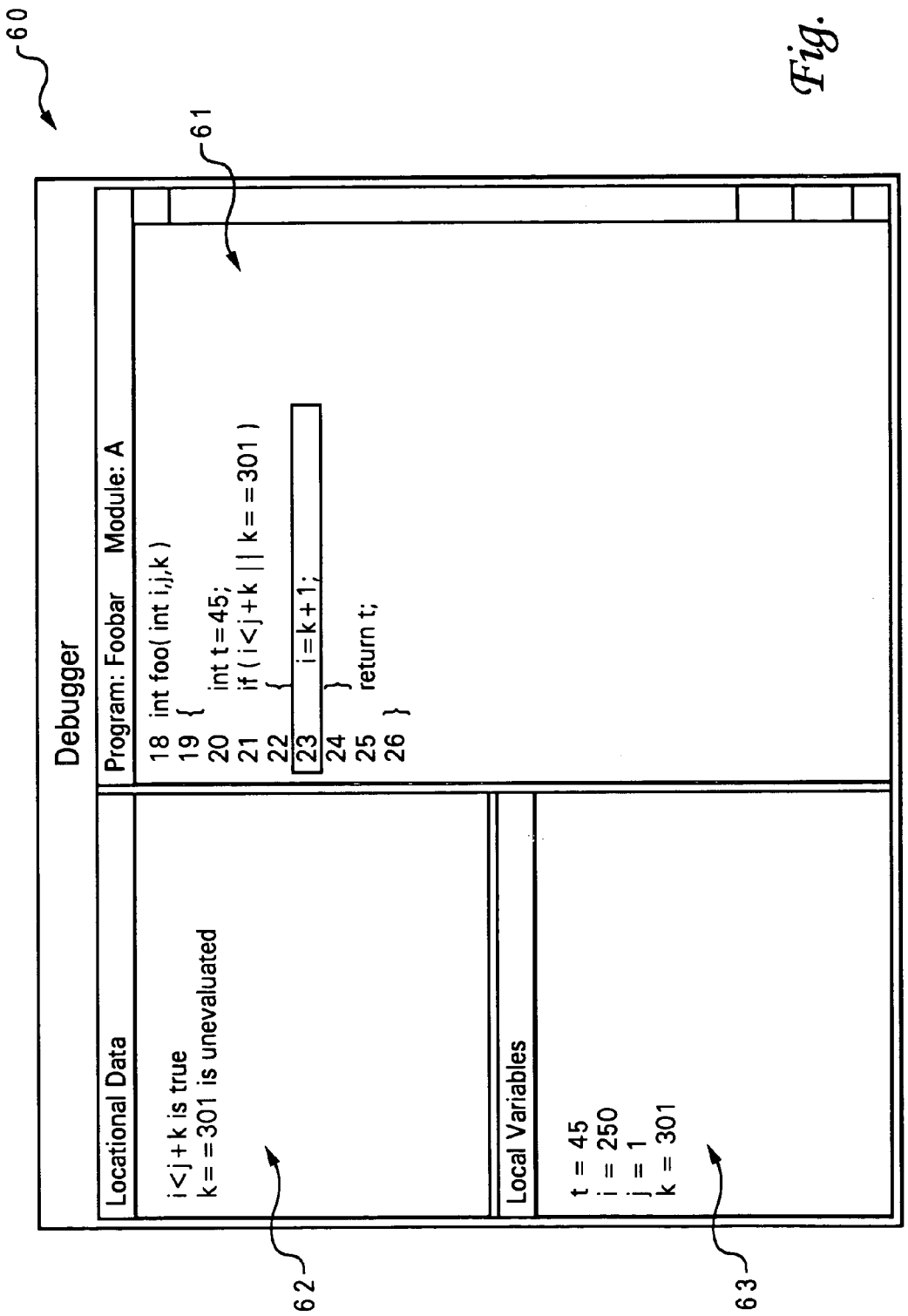
FIG. 6 is a graphical user interface of a software debugger, in accordance with a preferred embodiment of the present invention.

With reference now to FIG. 6, there is shown a graphical user interface (GUI) of a software debugger, in accordance with a preferred embodiment of the present invention. As shown, a software debugger GUI 60 includes a program window 61, an informational monitor window 62, and a local variables window 63. In this illustration, a module of a software program Foobar is displayed within a program window 61 with line 23 being highlighted, which means the execution of the software program Foobar is stopped at line 23. Informational monitor window 62 displays both the expression that was executed (i.e., i<j+k is true) and the expression that was not executed (i.e., k==301). In other words, line 23 was executed because the condition of i<j+k being true. Local variables window 63 displays all the variables that are related to the above-mentioned condition so that a programmer can quickly identify the cause of line 23 being executed. In this example, j+k=1+301, which is greater than 250 (or i). After the execution of line 23, the variable t should be k+1=301+1=302.

It is understand by those skilled in the art that software debugger GUI 60 can be implemented in various forms. For example, the location of each of the condition sub-expressions can be determined and the expressions that are true can be highlighted, such as the expression i<j+k in line 21 within program window 61 can be highlighted. Also, variables and their respective values, such as "i=250, j=1, and k=301," instead of expression "i<j+k is true" can be displayed in information monitor window 62. Similarly, variables and their respective values, such as "if (250<1+301)||301==301" instead of expression "if (i<j+k)||k==301" can be displayed in line 21 of program window 61, where the value of i=250, j=1, and k=301, with a highlight to indicate that the variables are being displayed concurrently at their current values. Similarly, whether a variable is not actually a variable but is a constant or a function call can be indicated by an appropriate highlight. In addition, an expression tree for each expression within highlighted statement (i.e., line 23) can be displayed in information monitor window 62. The different views of the variables and values can be selected such that the user can select which view and which highlight to see, whether one view or multiple views concurrently or no views.

As has been described, the present invention provides a software debugger having an informational monitor for conditional statements. The informational monitor of the present invention provides a means for automatically informing a user, such a programmer, why a conditional statement responded the way it did. It alleviates the need for the user to choose variables to evaluate while studying the boolean logic that comprises the conditional expression. In many disparate situations, the software debugger of the present invention can reduce the need to rerun the program by providing significant helps after the conditional expression has been executed.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for monitoring conditional statements of a software program via a software debugger, said method comprising:
    identifying a program construct within a software program, wherein said program construct is a conditional statement;
    identifying at least one point of interest within said program construct;
    associating a plurality of debug instructions with said at least one point of interest within said program construct; and
    in response to a program stop event occurred at said at least one point of interest, displaying information related to said at least one point of interest as a result of executing instructions within said program construct, wherein said information is based on said plurality of debug instructions.

2. The method of claim 1, wherein said program stop event is a breakpoint.

3. The method of claim 1, wherein said conditional statement is a conditional IF statement.

4. The method of claim 1, wherein said method further includes a step of storing said plurality of debug instructions in a locational debug information table.

5. The method of claim 1, wherein said identifying steps are performed by a compiler.

6. A computer program product residing on a computer usable memory for monitoring conditional statements of a software program via a software debugger, said computer program product comprising:
    program code means for identifying a program construct within a software program, wherein said program construct a conditional statement;
    program code means for identifying at least one point of interest within said program construct;
    program code means for associating a plurality of debug instructions with said at least one point of interest within said program construct; and
    program code means for displaying information related to said at east one point of interest as a result of executing instructions within said program construct, wherein said information is based on said plurality of debug instructions, in response to a program stop event occurred at said at least one point of interest.

7. The computer program product of claim 6, wherein said program stop event is a breakpoint.

8. The computer program product of claim 6, wherein said conditional statement is a conditional IF statement.

9. The computer program product of claim 6, wherein said computer program product further includes a locational debug information table for storing said plurality of debug instructions.

10. The computer program product of claim 6, wherein said program code means for identifying is contained within a compiler.

11. A computer system comprising:
    a processor;
    a monitor coupled to said processor; and
    a memory coupled to said processor, wherein said memory includes
    means for identifying a program construct within a software program wherein said program construct is a conditional statement;
    means for identifying at least one point of interest within said program construct;
    means for associating a plurality of debug instructions with said at least one point of interest within said program construct; and
    means for displaying information related to said at least one point of interest as a result of executing instructions within said program construct, wherein said information is based on said plurality of debug instructions, in response to a debug stop occurred at said at least one point of interest.

12. The computer system of claim 11, wherein said program stop event is a breakpoint.

13. The computer system of claim 11, wherein said conditional statement is a conditional IF statement.

14. The computer system of claim 11, wherein said computer system further includes a locational debug information table for storing said plurality of debug instructions.

* * * * *